United States Patent [19]

Reudink et al.

[11] 4,355,411
[45] Oct. 19, 1982

[54] TECHNIQUE FOR EFFICIENT SPECTRUM UTILIZATION IN MOBILE RADIO SYSTEMS USING SPACE DIVERSITY

[75] Inventors: Douglas O. Reudink, Sea Girst; Yu S. Yeh, Freehold, both of N.J.

[73] Assignee: Bell Telephone Laboratories, Incorporated, Murray Hill, N.J.

[21] Appl. No.: 276,255

[22] Filed: Jun. 22, 1981

Related U.S. Application Data

[63] Continuation-in-part of Ser. No. 132,909, Mar. 24, 1980, abandoned.

[51] Int. Cl.³ .......................... H04B 3/60; H04B 7/06; H04B 15/00
[52] U.S. Cl. ........................... 455/33; 455/52; 455/56
[58] Field of Search ............... 455/31, 33, 52–54, 455/56, 57, 62, 63, 50; 179/2 EB; 375/40

[56] References Cited

U.S. PATENT DOCUMENTS

| | | | |
|---|---|---|---|
| 3,310,741 | 3/1967 | Uitermark et al. | 455/33 |
| 3,582,787 | 6/1971 | Muller et al. | 455/33 |
| 3,913,017 | 10/1975 | Imaseki | 455/33 |
| 4,025,853 | 5/1977 | Addeo | 455/33 |
| 4,032,846 | 6/1977 | Hirade et al. | 375/40 |
| 4,128,740 | 12/1978 | Graziano | 455/33 |
| 4,144,409 | 3/1979 | Utawo et al. | 455/33 |
| 4,144,411 | 3/1979 | Frenkiel | 179/2 EB |
| 4,144,412 | 3/1979 | Ito et al. | 455/33 |
| 4,144,496 | 3/1979 | Cunningham et al. | 455/53 |
| 4,308,429 | 12/1981 | Kai et al. | 179/2 EB |

OTHER PUBLICATIONS

"The Cellular Concept"–V. H. MacDonald–B.S.T.J., vol. 58, No. 1, Jan. 1979, pp. 15–41.
"Cell Site Hardware"–N. Ehrlich et al.–B.S.T.J., vol. 58, No. 1, Jan. 1979, pp. 153–173.
"Efficient Spectrum Utilization for Mobile Radio Systems Using Space Diversity"–Y. S. Yeh et al., Int'l. Conf. on Radio Spectrum Conservation Techniques, London, England, Jul. 7–9, 1980, pp. 12–16.

*Primary Examiner*—Marc E. Bookbinder
*Attorney, Agent, or Firm*—Erwin W. Pfeifle

[57] ABSTRACT

The present invention relates to a technique for efficient spectrum utilization in mobile radio systems divided into a plurality of geometrically-shaped cells (10–21). Mobiles (24) in each cell are served by at least one base station (30–40) comprising a directional antenna having a beamwidth corresponding to the overall area of the associated cell. Each base station communicates with mobiles within the associated cell using separate primary channels ($C_p$) within a first portion of the system frequency spectrum when a mobile is not experiencing interference above a predetermined interference level, and switches a mobile to a separate secondary channel ($C_p$) within a selected section ($f_1$, $f_2$, $f_3$) of the remaining second portion ($f_i$) of the system frequency spectrum when the interference at a mobile exceeds the predetermined interference level. Each selected section used in adjacent portions of adjacent cells being within a different frequency subband of the second portion.

11 Claims, 9 Drawing Figures

TECHNIQUE FOR EFFICIENT SPECTRUM UTILIZATION IN MOBILE RADIO SYSTEMS USING SPACE DIVERSITY

CROSS-REFERENCE TO RELATED APPLICATION

This application is a continuation-in-part of application Ser. No. 132,909 filed Mar. 24, 1980, abandoned.

BACKGROUND OF THE INVENTION

1. Field of the Invention

The present invention relates to a technique for efficient spectrum utilization in mobile radio systems using space diversity and, more particularly, to a technique in cellular mobile radio systems wherein mobiles in an associated cell communicate with base stations of that cell using separate primary channels within a major portion of the overall system frequency spectrum when a mobile is not experiencing interference from adjacent cells above a predetermined interference level and are switched to a separate secondary channel within a selected section of the remaining minor portion of the overall system frequency spectrum when a mobile experiences interference above the predetermined interference level.

2. Description of the Prior Art

In a Rayleigh fading environment with a signal and interferences coming from all directions, a space diversity receiver cophased to the desired signal provides coherent combining of the desired signal and incoherent combining of the interferences. In a non-interference environment, space diversity combining smoothes out the amplitude fluctuations of the received signal. For example, in a Rayleigh fading environment, to insure that a single branch receiver remains above some threshold 99.9 percent of the time requires that the mean received power be about 30 dB above this threshold, whereas this same threshold can be exceeded the same amount of time with 26 dB less transmitted power if 4 space diversity branches are employed. These same general remarks hold true in the case of interference. Once the number of diversity branches reaches 10 or so, envelope fluctuations in the received signal essentially disappear and signal-to-interference increases in proportion to the number of diversity branches.

The provision of mobile telephone service to a large number of users is most efficient when frequencies are reused through cellular building blocks. Hexagonal cells often are chosen for design purposes because they are fairly good approximations to circles. Also because hexagons tesselate a plane, frequency reuse is achieved in an orderly way. An article "Advanced Mobile Phone Service: The Cellular Concept" by V. H. MacDonald in *The Bell System Technical Journal*, Vol. 58, No. 1, January 1979 at pages 15–41 describes a mobile radio-telephone system which can include hexagonal cells having three alternate corners equipped with base stations including 120 degree directional antennas. Channel sets are defined and distributed among the various cells to keep co-channel and adjacent-channel interference within acceptable bounds. With reference to hexagonal cellular regions, see also U.S. Pat. No. 3,582,787 issued to J. J. M. Garches et al on June 1, 1971 and U.S. Pat. No. 4,128,740 issued to V. Graziano on Dec. 5, 1978, the latter patent using sectoral horns for cell communication.

Spread spectrum techniques with frequency hopping have been proposed as an alternative method for mobile communication in recent years. Conceptually, the success of spread spectrum frequency reuse techniques is due to their ability to cope with cochannel interference by the combining, in one form or another, of frequency diversity channels. Additionally, frequency diversity is a wellknown, effective technique to combat Rayleigh fading. However, it appears that any frequency diversity scheme must pay a price in the inevitable reduction of spectrum efficiency. If cost and receiver complication are not issues, space diversity at both the mobile and base offers an opportunity of providing very high spectral efficiency as well as reducing fading.

The problem remaining in the prior art is to provide a mobile radio communication system which provides improved spectrum efficiency and can provide a significant advantage against shadow fading.

SUMMARY OF THE INVENTION

The foregoing problem has been solved in accordance with the present invention which relates to a technique for efficient spectrum utilization in mobile radio systems using space diversity. More particularly, the present technique relates to cellular mobile radio systems wherein mobiles in an associated cell communicate with one or more base stations of that cell using separate primary channels within a first portion of the overall system frequency spectrum when a mobile is not experiencing interference from adjacent cells above a predetermined interference level and are switched to a separate secondary channel within a selected section of the remaining second portion of the overall system frequency spectrum when a mobile experiences interference above the predetermined interference level.

It is an aspect of the present invention to provide a mobile radio communication system which employs sectoral horn antennas at the base stations to provide a significant advantage against shadow fading. More particularly, mobiles in each cell are served by at least one base station which may be disposed on the boundary of the associated cell and includes a directional antenna having a beamwidth which corresponds to the boundary of the associated cell on either side of the base station. Each of the base stations of an associated cell are then capable of transmitting primary and secondary radio channels to mobiles not experiencing interference or experiencing interference, respectively, from adjacent cells as mentioned hereinbefore. Alternative arrangements with different base station locations with the use of sectoral horn antennas is also possible to achieve a similar effect.

Other and further aspects of the present invention will become apparent during the course of the following description and by reference to the accompanying drawings.

BRIEF DESCRIPTION OF THE DRAWING

Referring now to the drawings, in which like numerals represent like parts in the several views.

DETAILED DESCRIPTION

Figure 1:
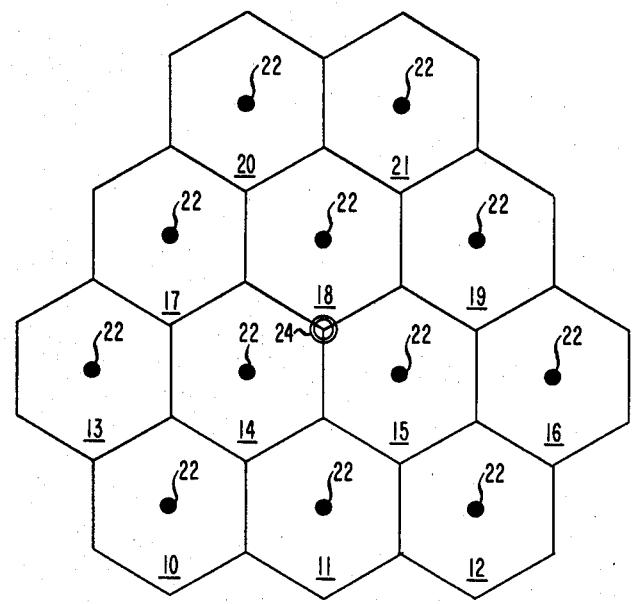
FIG. 1 is a graphical view of a prior art type center illuminated cellular RF communication system.

FIG. 1 illustrates a typical known hexagonal cell layout for a mobile radio communication system including 12 cells designated 10-21 with a base station 22 located at the center of each cell. Assuming that the mobiles and the base station 22 in each cell include omni-directional transmitting antennas and many branch space diversity receivers and use either PSK or FM modulation, then for 100 percent spectrum efficiency the system serves a total of $N=(W/R)$ users in each cell, where W is the total bandwidth of the system and R is the information rate or the channel bandwidth of each user.

For purposes of discussion, it will be assumed that the field strength of transmitted signals fall with the inverse cube of the distance, that a mobile is in a Rayleigh fading environment and that antenna elements receive independent signals whose means are equal. With such assumption, the worst interference situation for a mobile in the arrangement of FIG. 1 is when such mobile is at the extreme corner where three cells meet. For example, a worst interference situation for a mobile 24 in cell 14 occurs when such mobile 24 is in the extreme corner where cell 14 meets with cells 15 and 18. Under such condition, mobile 24 would receive its correct channel signal from base station 22 of cell 14 and interfering signals from base stations 22 in other cells 10-13 and 15-21 also transmitting information on the same channel, which other base stations 22 are located on rings of predetermined distances from mobile 24.

From calculations performed to derive the total interference power, $P_I$, for a single branch, it has been found that such power can be approximated to $P_I = 3$. The ratio of the average signal power, $P_S$, to the average interference power, $P_I$, at the cell corner, therefore, is $(P_S/P_I) = -4.8$ dB. Furthermore, the signal envelope may fade resulting in a worse carrier-to-interference ratio. By providing an L-branch space diversity receiver at mobile 24, the signals can be combined coherently and the interferences arriving from other base stations can be combined incoherently and the signal-to-interference power ratio then becomes $(P_S/P_I) = (L/3)$. Since the signal power, $P_S$, results from the coherent combining of L independent Rayleigh fading channels, such output has virtually no fading and is almost constant provided a sufficient number of elements are used. The interference is a combination of a large number of random variables with unequal strength and is considered as Gaussian. For example, to achieve a bit error rate, $P_e$, of $10^{-3}$, the required CNR for coherent 2-phase PSK modulation is 6.9 dB, and allowing 1 dB margin for detection degradation $L=20$ elements provide such performance.

With reference to the worst interference condition for a base station 22, the worst condition occurs when the desired mobile is located at the associated cell's edge and the interfering mobiles in all other cells are located as close to the concerned base station as possible. Under such condition the signal-to-interference ratio turns out to be $(P_S/P_I) = (1/10) = -10$ dB. To achieve a bit error rate of $P_e = 10^{-3}$ under such worst condition situation would require a 67-element space diversity receiver at the base station 22. A more realistic approach, however, is to realize that an interfering mobile can be anywhere within its own cell with the dominant interference coming from the first six surrounding cells. Under such condition, it has been determined that a 24-element space diversity receiver at the base station 22 provides a $(P_S/P_I) = -8.2$ dB which is adequate to maintain a $10^{-3}$ bit error rate.

Figure 2:
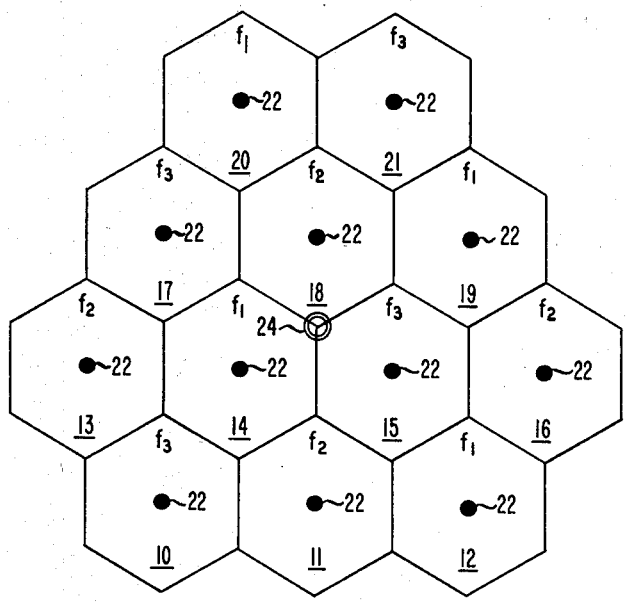
FIG. 2 is a graphical view of a prior art type center illuminated cellular RF communication system which uses a 3-frequency band plan.

FIG. 2 illustrates a known hexagonal cell layout as shown in FIG. 1 including cells 10-21 and centrally located base stations 22, but differs from the arrangement of FIG. 1 in that the entire frequency spectrum for the system is divided into 3 equal segments and a separate segment is assigned to each cell, as indicated, in a manner whereby no adjoining cell uses the same frequency band segment. With such arrangement, the worst interference situation at a mobile 24 in cell 14 is still when mobile 24 is located at the corner closest to a cell also using the same frequency band segment as, for example, cell 19. It can readily be seen that interference caused by base station 22 in cells 12, 19 and 20 at mobile 24 is not as great as that at mobile 24 in the arrangement of FIG. 1 since a greater distance is involved between the interfering base stations and mobile 24 and there are less of them. It has been found that for the arrangement of FIG. 2, a 4-branch space diversity receiver at mobile 24 will meet bit error rate requirements of $10^{-3}$. Similarly, calculations for interferences at a base station 22 from mobiles in nearby cells using the same frequency band segment, indicate that a 5-branch space diversity receiver at a base station 22 will provide operation at a bit error rate of $10^{-3}$.

Figure 3:
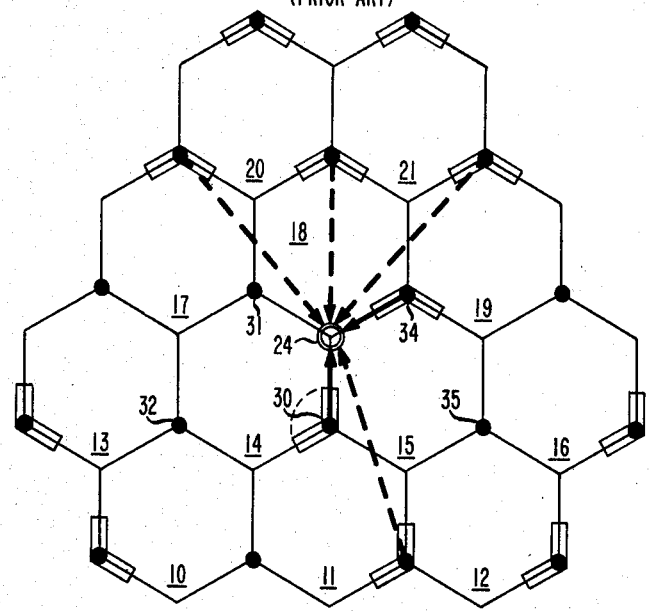
FIG. 3 is a graphical view of a prior art type corner illuminated cellular RF communication system.

FIG. 3 illustrates a graphical view of a prior art type corner illuminated hexagonal cell mobile radio communication system. The arrangement of FIG. 3, without increasing the number of base stations 22 of FIG. 1, provides diversity against shadowing which cannot be achieved by space diversity receivers alone, and furthermore the required number of diversity branches can be reduced if the base stations are located at the alternate cell corners and equipped with sectoral horns. More particularly, hexagonal cell 14 is served by base stations 30, 31 and 32 located at alternate cell corners. Each of base stations 30, 31 and 32 radiates a pattern with a beamwidth of 120 degrees which is aligned with the boundary of the associated cell 14 on either side of the base station. Besides serving cell 14, base station 30 also serves cell 11 and 15 with antenna patterns each of 120 degree beamwidth. Similarly, base station 31 also serves cells 17 and 18 and base station 32 also serves cells 10 and 13 with antenna patterns each of 120 degree beamwidth. In a similar manner each cell 10-21 has three base stations disposed on alternate corners thereof and shown by a heavy dots in FIG. 3, each base station serving all cells which bound thereon with separate 120 degree beamwidth antenna patterns.

In an arrangement of FIG. 3, any mobile in a cell is served by one of the three associated base stations. Assuming that a mobile 24 in cell 14 is located at the cell corner where cells 14, 15 and 18 meet and is being served by base station 30 and that each base station antenna covers an angle of exactly 120 degrees along the cell boundaries. If the system is designed for 100 percent spectral efficiency, then the nearest interference comes from base station 34 in cell 15. Base station 34 would use the same channel frequency of the mobile 24 in cells 15 and 18, but since it is assumed that these two patterns do not overlap, at most one of these base station 34 antennas will interfere with the mobile. In FIG. 3 the interference is arbitrarily picked as coming from station 34 rather than base station 35 serving cell 15 with the rest of the interferences being marked by indicating with heavy lines the base stations and the sectoral antennas serving a particular cell. In addition, heavy dashed lines to the mobile 24 indicate the interferences coming from the several selected few closest base stations other than base station 34 which is shown by a heavy solid line.

For the arrangement of FIG. 3, the average signal power to average interference power ratio per single branch is $(P_S/P_I) = 1.76$ dB and a 12 branch space diversity receiver at mobile 24 will provide a bit error ratio of $10^{-3}$. Interference at a base station in FIG. 3 occurs from the reception of signals from mobiles in all other cells which are within the 120 degree antenna pattern of the associated base station antenna. Assuming interfering mobiles can be anywhere inside their associated cell, it has been determined that a 12-branch space diversity receiver at the base station will provide a bit error rate of $10^{-3}$.

The primary function of a space diversity receiver is to combine coherently the independent Rayleigh fading signals on each antenna branch. Numerous pilot and delayed signal as pilot schemes or signal feedback arrangements are known in the art. Besides simplicity, the feedback methods have the further advantage that they use the full signal strength to derive the appropriate phase information. A two-branch version of this scheme often called a Granlund combiner is one example of such receiver. This signal feedback scheme, which works well for cellular arrangements with large carrier-to-interference ratios tend to lose their effectiveness when the carrier-to-interference ratio prior to combining is near unity. Under such conditions the receiver will alternately lock on either of the modulations choosing the one that is momentarily the strongest.

Another type of signal feedback diversity receiver reported for satellite communications can pick out the desired signal even if it is weaker than the interference signal. Such receivers appear suitable for spectrum efficient mobile radio systems as described in FIGS. 1-3 and for the spectrum efficient system in accordance with the present invention as will be described hereinafter. In this regard see, for example, U.S. Pat. No. 3,911,364 issued to R. E. Langseth et al on October 7, 1975 and U.S. Pat. No. 4,027,247 issued to W. L. Aranguren on May 31, 1977. It is to be understood that any suitable space diversity receiver can be used for practicing the present invention as will be described hereinafter.

There are at least two ways to achieve spectrum efficiencies greater than 100 percent. One way is from the point of view of base stations, or real estate. Consider a system where the cell sites have been chosen and some initial spectrum efficiency achieved. Now if in some clever way these sites are merely modified so that more channels can be used, then it can be argued that the efficiency has been increased. For example, by using 3 directive antennas at each cell site as shown in FIG. 3, and employing space diversity at both the base and at mobiles, a spectrum efficiency of 300 percent can theoretically be achieved. This means that the entire spectrum is reused 3 times at each cell site and the density of channels per unit area is increased threefold. In FIG. 3, within cell 14, for example, to achieve a spectrum efficiency of 300 percent, antennas at base stations 30, 31 and 32 would use the entire frequency band simultaneously to communicate with the different mobiles in cell 14 three times over. For a mobile in cell 14, communicating through the antenna a base station 30, for example, the primary interference comes from antenna transmissions at base stations 31 and 32 who also serve cell 14.

Consideration should, however, be given to what is required so that 3 channels can be used simultaneously at any point within a cell creating 300 percent spectrum efficiency. Now at any arbitrary point in the cell each mobile communicates through a different base station. At the point where the mobiles are co-located, the path losses back to the respective base stations could vary widely. Controlling the transmitter power from each base station equalizes the signal strengths at the point where the mobiles are located. Thus each mobile operates with a -6 dB S/I, neglecting interference from adjacent cells, and employs space diversity to raise its signal to an acceptable level.

For the mobile-to-base paths it is assumed that all mobiles transmit equal power. Again each base station must employ a sufficient number of space diversity elements to overcome a $-6$ dB SIR. For a line-of-sight path from the base to mobiles it would be impossible to discriminate colocated mobiles since it is assumed that they are all using omni-directional antennas. Fortunately, such is rarely the case in mobile radio communications. In the normal fading environment, mobiles even bumper-to-bumper would produce uncorrelated signals at the base station, permitting space diversity to operate.

For mobiles located at arbitrary points within the cell it is clear that this system is unworkable without some form of call hand off within the cell. Consider a mobile in close proximity to station 31, but having been assigned to station 30. Without power control, station 31 would obviously overwhelm any transmission from station 30. Even if power control is used at the base stations, if base station 31 is communicating to a distant mobile, its transmission is still likely to overwhelm nearby mobiles if they are communicating through a different base station. The solution to this problem lies in the assignment and reassignment algorithms. If mobiles within the cell are always assigned to the station with the largest signal, then the worst case SIR is $-6$ dB from the other two base stations also serving the cell, minus an amount of interference from adjacent cells. Should all the interference be as much as 10 dB greater than the desired signal, 67 diversity branches are sufficient to maintain a $10^{-3}$ BER.

The mobile-to-base interference again requires that mobiles communicate through the base station from which it receives the strongest signal within the cell. Thus within the cell the worst case SIR is −6 dB. Additionally, there are pathological cases where there are 3 mobiles in adjacent cells near the cell boundaries which interfere with the mobile-to-base transmission. Thus the interference power is approximately 10 dB while the signal power is unity. Again 67 diversity branches insures a $10^{-3}$ BER for this worst case.

From the foregoing discussion, it has been shown that in the exemplary corner base station schemes, the worst case interference can be quite severe, and thus requiring a large number of diversity elements for acceptable reception at each base station and mobile. In accordance with the present invention, this problem is overcome by dedicating a few channels to serve the regions of high interference in each cell.

Figure 4:
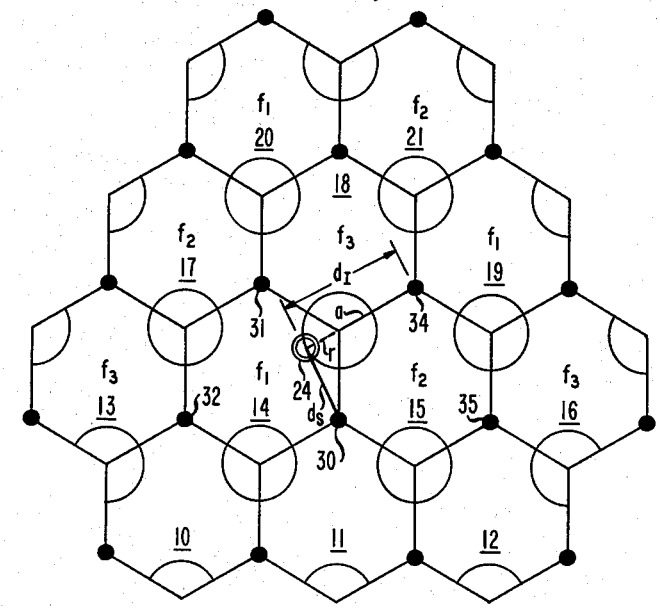
FIG. 4 is a graphical view of a corner illuminated cellular RF communication system with a portion of the frequency spectrum divided into three segments serving noncontiguous cells to overcome interference in accordance with the present invention.

FIG. 4 shows the interference regions of concern in cells 10–21 which are semicircular regions at cell corners where no base station is disposed, and the discussion hereinafter is concerned primarily with mobile 24 in cell 14 communicating with base stations 30 and 31. The major source of interference for mobile 24 in cell 14 comes from base station 34 in cell 15 where base stations are transmitting in each cell over corresponding channels.

Figure 5:
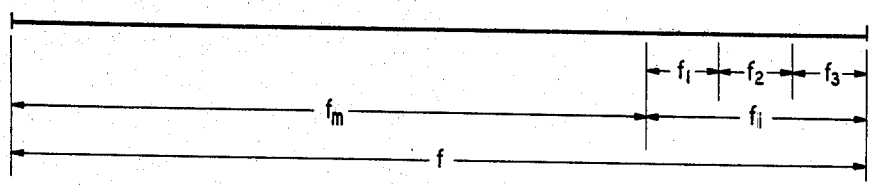
FIG. 5 is a typical diagram showing the overall system frequency band divided into a major and a minor portion with the minor portion divided in a 3-frequency band plan in accordance with the present invention.

As shown in FIG. 5, the overall frequency spectrum, f, is divided into a main portion, $f_m$, and a minor portion, $f_i$, with the minor portion, $f_i$, being divided into three sections $f_1$, $f_2$ and $f_3$ according to a 3-frequency plan. In accordance with one arrangement of the present invention each of the three frequency sections $f_1$, $f_2$ and $f_3$ of the minor portion $f_i$ are associated exclusively with each noncontiguous cell as indicated in FIG. 4. The channel sets $f_1$, $f_2$ and $f_3$ are intended to serve the interference regions, but may be used anywhere within the cell. Additionally, there are $C_p$ channels forming main portion $f_m$ of the overall system frequency spectrum which represent a common pool of channels available to any mobile in any cell being served by one of the three corner base stations.

Calculations have been made to show that with a modest number of diversity branches (4) the region of complete frequency reuse from cell-to-cell is a very large fraction of the cell area. For the case where mobiles are uniformly distributed in the cells, channels can be assigned according to the area served, and under these conditions a channel efficiency factor of 88 percent can be achieved using only four diversity branches. More particularly, the area of a hexagon with sides equal to "a" is $$A = \frac{3\sqrt{3}}{2} a^2 = 2.6 a^2. \tag{1}$$

With no loss of generality, "a" can set to $a = 1$. For the common pool of channels the worst case interference for transmissions from base station 30 to a mobile 24 in cell 14 occurs at the point where mobile 24 is indicated in FIG. 4. At this point the distance, $d_I$, from the nearest base station 34 in cell 15 to mobile 24 using the same frequency, is $$d_I = 1 + r, \tag{2}$$

and the signal distance, $d_s$, from the base station 30 to mobile 24 is $$d_s = \sqrt{1 - r + r^2}. \tag{3}$$

Using 4 branch diversity, a combiner output of S/I = 10 dB is needed to achieve a $10^{-3}$ BER. Thus at mobile 24 it is required that $$(S/I) = \frac{10}{4}, \tag{4}$$

or $$\left(\frac{d_I}{d_s}\right)^3 = 2.5. \tag{5}$$

Thus $$(1 + r)/\sqrt{1 - r + r^2} = (2.5)^{\frac{1}{3}} = 1.357, \tag{6}$$

and solving for r $$(1 + r)^2 = 1.84(1 - r + r^2) \tag{7}$$
$$r = .231.$$

The area served by dedicated channels is $$3 \times (\tfrac{1}{2}\pi r^2) \tag{8}$$
$$= .167.$$

Therefore the ratio of the dedicated channel area to the total area is $$\frac{A_d}{A_t} = \frac{\pi r^2}{2.598} = \frac{.167}{2.598} = .064. \tag{9}$$

Apportioning channels according to area implies that each cell requires about 6 percent of the total circuits in that cell dedicated to serve the interference region. With 3 sets of dedicated channels required to insure negligible interference, the number of channels available for reuse can be found, knowing $C_T = C_P + 3C_d$, where $C_T$ is the overall number of channels, $C_p$ is the number of channels formed in the major portion $f_m$ of the frequency band in FIG. 5 and $C_d$ is the number of channels formed in each of the three sections $f_1$, $f_2$ or $f_3$ of the minor portion $f_i$ of the frequency band in FIG. 5.

Thus $C_p = 82$ percent. The efficiency is determined by the number of circuits available in a cell divided by the total number of circuits. In this case $$\eta = \frac{C_p + C_d}{C_T} = 88\%. \tag{10}$$

Figure 6:
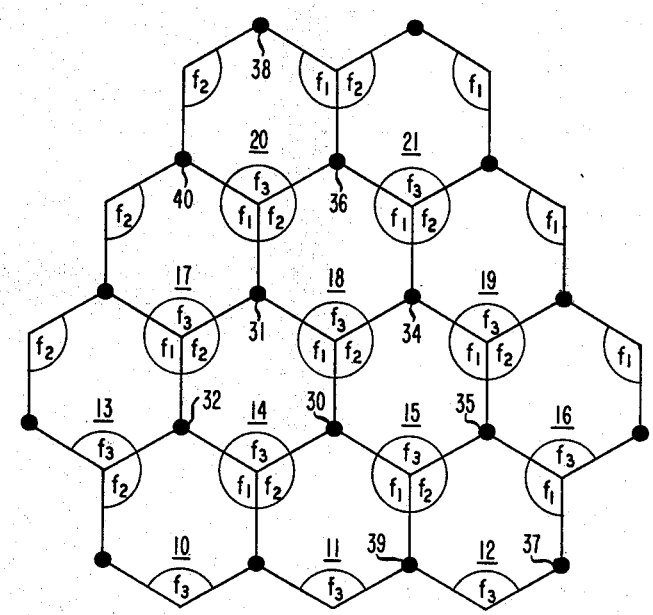
FIG. 6 is a graphical view of a corner illuminated cellular RF communication system with a portion of the frequency spectrum divided into three segments and assigned to overcome interference in an alternative arrangement to that of FIG. 4.

It is possible to achieve 100 percent frequency reuse, i.e., use of all of the channels in every cell by modifying the dedicated channel assignments. In this case, all of the dedicated channels are used in each cell, but only certain ones may be used at each base station to communicate with mobiles experiencing interference above a predetermined threshold level at, for example, the interference corners. This concept forming an alternative arrangement in accordance with the present invention is illustrated in FIG. 6. In cell 14, for example, channels in frequency subband $f_1$ are employed at base stations 30 and 31 to serve the pie-shaped interference region therebetween labeled $f_1$. Similarly, base stations 31 and 32 employ channels in subband $f_2$ to serve the pie-shaped interference region therebetween labeled $f_2$ and base stations 30 and 32 employ channels in frequency subband $f_3$ to serve the pie-shaped interference region therebetween labeled $f_3$. Such arrangement provides two base stations to work against shadow fading.

All frequency sets $f_1$, $f_2$ and $f_3$ are used with this arrangement in each cell 10–21 and also in the three pie-shaped interference zones adjacent each other where the three adjacent zones meet. More particularly, as stated hereinbefore, in each cell, as shown, for example, for cell 14, each of the three pie-shaped interference regions therein is served by a separate one of the three frequency subbands $f_1$, $f_2$ or $f_3$ forming minor portion $f_i$ of the overall frequency band of FIG. 5. Additionally, each of the up to three pie-shaped interference zones at the intersection of three adjacent cells, where no base station is located, is also served by a separate one of the three frequency subbands $f_1$, $f_2$ or $f_3$. For example, in cell 14 in FIG. 6 base stations 30 and 31 use frequency subband $f_1$ to serve the interference region therebetween while base stations 30 and 34 use frequency subband $f_2$ to serve the interference region in cell 15 located therebetween and base station 34 and 31 use frequency subband $f_3$ to serve the interference region of cell 18 located therebetween. In similar manner, the bordering pie-shaped interference regions in all adjacent cells 10–21 use different ones of the three frequency subbands to permit communication with mobiles outside the dedicated pool channels $C_p$, when a mobile is experiencing interference above a predetermined interference level while using a dedicated channel in the major portion $f_m$ of the system frequency spectrum.

As stated hereinbefore, each base station uses a sectoral antenna which radiates outward at 120 degrees following the hexagonal cell boundaries on either side of the base station. If such antenna is used to radiate both the transmissions associated with the dedicated channels, $C_p$, in the major portion of the frequency spectrum, $f_m$, and the assigned interference channels, $C_d$, in two of the three frequency subbands $f_1$, $f_2$ and $f_3$, to the two nearest pie-shaped interference regions on either side of the base station in a cell, then it can be seen that a mobile in the $f_1$ interference region of cell 14 would receive the $f_1$ channel transmission from base station 30 plus any corresponding $f_1$ channel interference from base stations in other cells whose antennas are aimed at the cell 14 $f_1$ interference region. More particularly, when considering the $f_1$ pie-shaped region of cell 14, the nearest base stations in other cells which would be able to send interfering $f_1$ channel information would come from base stations 34, 35 and 36 serving cells 15 and 18 bordering on cell 14.

To reduce interference in the pie-shaped interference regions of FIG. 6, a 120 degree antenna pattern could be used at each base station for transmitting dedicated channels $C_p$ within the major portion, $f_m$, of the frequency spectrum and a separate antenna which radiates 60 a 60 degree pattern from each base station along the adjacent cell boundary toward each of the associated pie-shaped interference regions. With such arrangement, base stations 34, 35 and 36 would not overlap region $f_1$ of cell 14 with their $f_1$ channel transmissions and the nearest base stations which could interfere with transmissions to region $f_1$ of cell 14 are base stations 37, 38, 39 and 40 of cells 12, 20, 11 and 17, respectively, which are further removed from the $f_1$ region of cell 14 than base stations 34–36 when using the 120 degree antenna patterns for all transmissions.

With the plan described for FIG. 6, the area served by each dedicated set of channels is reduced by $\frac{1}{3}$ in each cell. Thus, the area served by region $f_1$ is $$A_{f1} = \frac{\pi r^2}{3}, \tag{11}$$

while the total areas using dedicated channels is $$A_{f1} + A_{f2} + A_{f3} = \pi r^2. \tag{12}$$

In this case the fraction of pooled channels becomes $$C_p = \frac{A_t - A_d}{A_t} = 1 - \frac{\pi r^2}{2.6}, \tag{13}$$

and for 4 diversity branches $\pi r^2 = 0.167$ and $C_p = 94$ percent. Thus, in this example any particular base station is 96 percent efficient, i.e., it uses 96 percent of the total channels available.

If the mobiles are evenly distributed in the cell, then the channel efficiency in each cell can be 100 percent, since all of the dedicated channels can operate simultaneously, provided that there are mobiles in the dedicated areas. Throughout most of the cell area, 94 percent of the channels can be used always, and in fact all of the channels can be employed at any point where coverage permits since, as shown hereinbefore, the 60 degree sectoral antennas only cover $\frac{1}{3}$ of the cell. Only in those unique areas where there are dedicated channels is channel use restricted. It has been found that this arrangement of FIG. 6 with uniformly spaced mobiles requires only 2 percent dedicated channels in each problem service area. Because of the randomness of car movements and call attempts, it would be prudent to use more dedicated channels for these areas. Allowing 6 or even 10 dedicted channels still provides each base station with either 88 or 80, respectively, channels out of a total set of 100. Additionally, in periods of high traffic, the interference channels can be used whenever possible to provide added channels.

Figure 7:
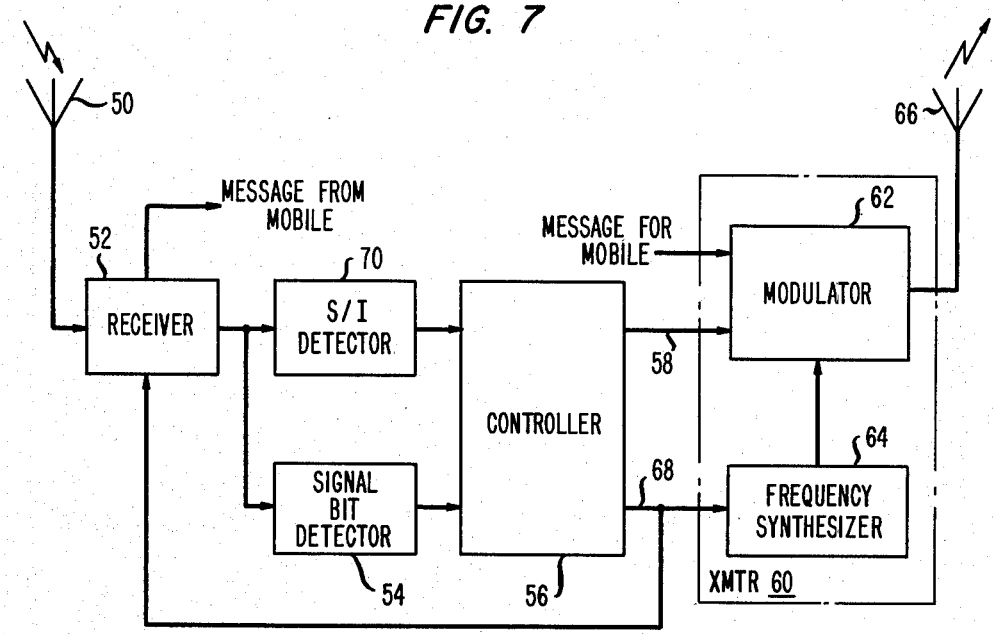
FIG. 7 illustrates a block diagram of a typical base station in accordance with the present invention.

FIG. 7 illustrates a block diagram of an exemplary base station for practicing the present invention. In operation, a mobile normally monitors its channel signal-to-interference (S/I) ratio and when such ratio exceeds a predetermined threshold level, the mobile notifies the base station over its signaling channel which may be, for example, certain designated bits in a transmission. Such transmission is received at antenna 50 of the associated base station and is demodulated at receiver 52 using the proper demodulation frequency for the assigned primary channel. A signaling bit detector 54 detects the signaling bits in the received transmission and alerts a controller 56 that the mobile is experiencing interference above a predetermined threshold.

Controller 56 chooses an idle secondary channel in the appropriate frequency section $f_1$, $f_2$ or $f_3$ of FIG. 5 which can be used for communicating with the mobile experiencing the interference and transmits such choice, via appropriately encoded signaling bits, over lead 58 to transmitter 60. The normal message signals plus the signaling information on lead 58 are modulated in modulator 62 of transmitter 60 with the proper primary channel carrier frequency which is generated by a frequency synthesizer 64 and the channel signal is transmitted to the mobile by antenna 66.

Upon receipt of such signaling information, the mobile can verify such secondary channel selection over its primary channel which is detected by signaling bit detector 54 who notifies controller 56 of such verification. Controller 56 then transmits enable signals to the mobile via lead 58 and to receiver 52 and frequency synthesizer 64 of transmitter 60 via lead 68 to cause the modulating carrier frequencies to be shifted to the proper secondary channel frequency.

Figure 8:
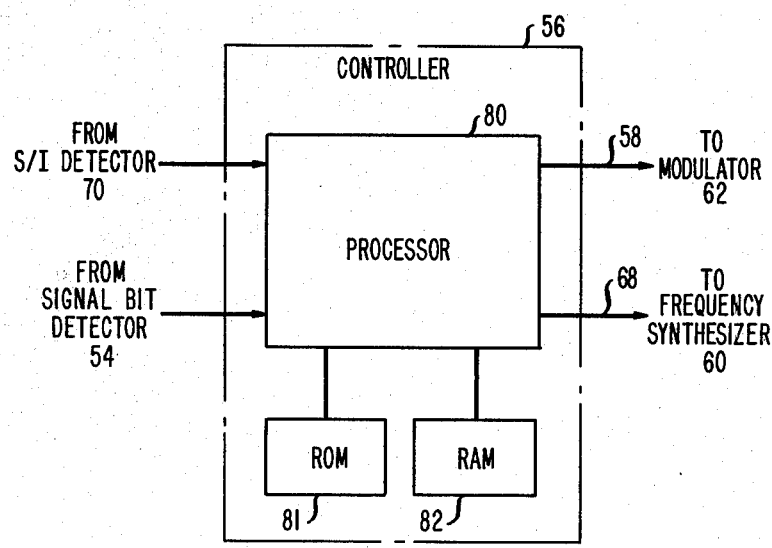
FIG. 8 is a block diagram of a well-known arrangement for the controller of FIG. 7.
Figure 9:
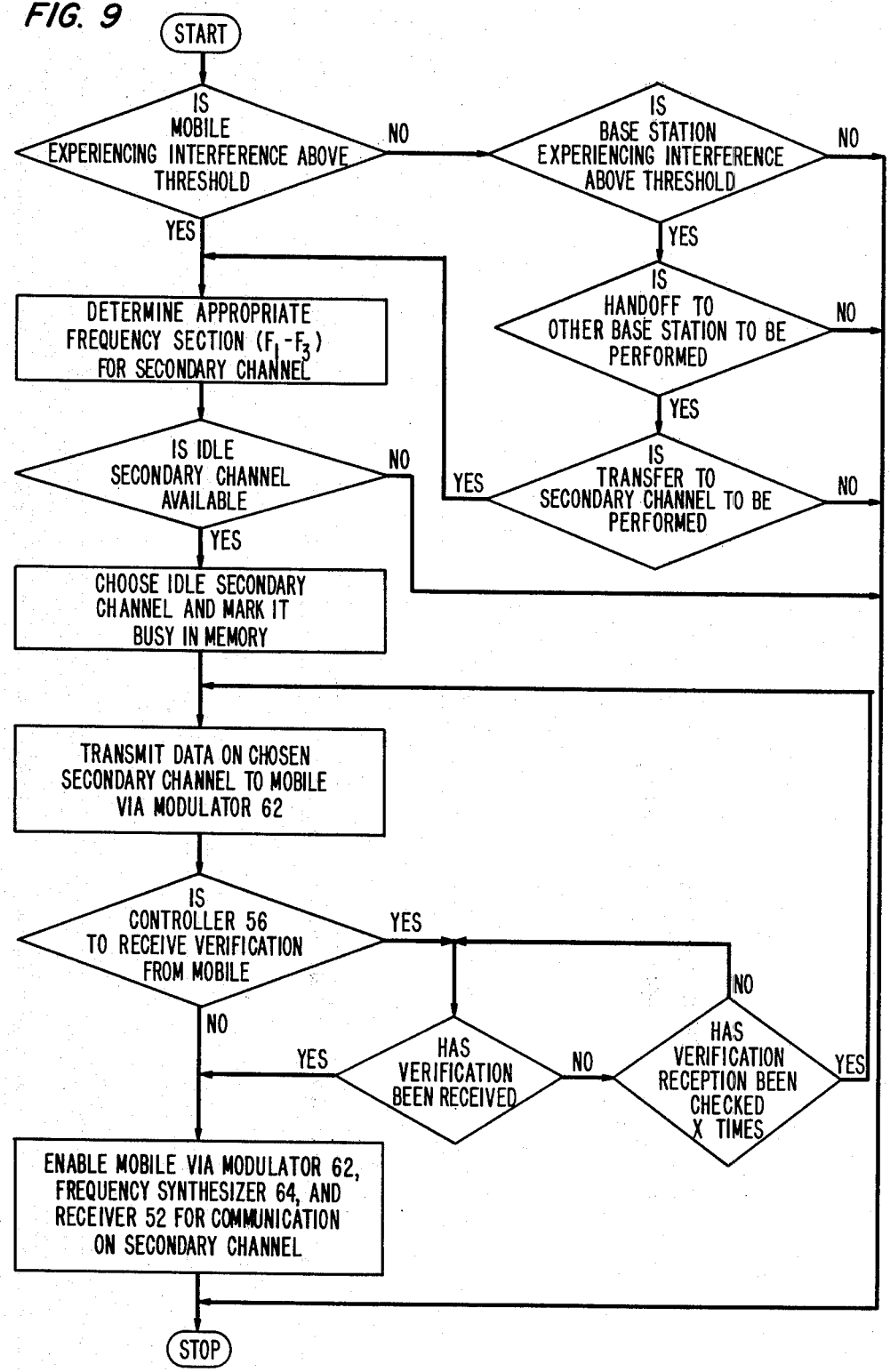
FIG. 9 is a flow diagram of the operation of the controller of FIG. 7.

A signal-to-interference detector 70 is also used at the output of the receiver to detect when the transmission from the mobile includes interference above a predetermined threshold level. When such threshold level is exceeded, detector 70 notifies controller 56 of such condition and transmissions between the mobile and base station are switched to another base station of a cell which has a stronger signal at the mobile or to an appropriate secondary channel as described hereinabove when this base station has the strongest signal at the mobile. It is to be understood that any suitable circuit can be used for each of the blocks of FIG. 7 which provide the function described for such component. For example, controller 56 can comprise a microprocessor 80 and associated memory in the form of a ROM 81 and a RAM 82 as shown in FIG. 8 for performing the functional steps described hereinbefore and shown in the flow diagram of FIG. 9. The use of microprocessors for controller 56 is well known in the art as shown, for example, in FIGS. 4 and 5 of the article "Cell-Site Hardware" by N. Ehrlich et al in BSTJ, Vol. 58, No. 1, January 1979, at pages 153-173 or in FIG. 10B of U.S. Pat. No. 4,144,412 issued to S. Ito et al on Mar. 13, 1979.

It is to be understood that the above-described embodiments are simply illustrative of the principles of the invention. Various other modifications and changes may be made by those skilled in the art which will embody the principles of the invention and fall within the spirit and scope thereof.

For example, the technique of transmitting information in primary channels ($C_p$) of a first portion of the overall system frequency spectrum to mobiles not experiencing interference above a predetermined interference level and switching such mobiles to secondary channels of a pool of channels in a second portion of the overall system frequency spectrum could also be applied to the system arrangement shown in FIG. 1. Additionally, the frequency subbands $f_1$, $f_2$ and $f_3$ could also be assigned in a different manner in the pie-shaped interference regions bordering on each other in FIG. 6 as long as each cell used all three subbands and no bordering interference regions used the same subband.

What is claimed is:

1. A method of communicating between a base station (30-40) and each of a plurality of mobiles (24) in a mobile radio communication system which is divided into a plurality of cellular areas (10-21) with each cell including at least one base station.

CHARACTERIZED IN THAT
   the method comprises the steps of:
   (a) transmitting information destined for each of the mobiles within an associated cell in a separate primary channel ($C_p$) of a plurality of primary channels within a first portion ($f_m$) of an overall system frequency spectrum when a mobile is not experiencing interference above a predetermined interference level from transmissions in corresponding primary channels in other cells of the system; and
   (b) switching an individual mobile in said associated cell to a separate predetermined secondary channel ($C_d$) of a plurality of available secondary channels within a selected section ($f_1$, $f_2$, $f_3$) of a remaining second portion ($f_i$) of the overall system frequency spectrum when the individual mobile experiences interference from other cells above said predetermined interference level in its originally assigned primary channel, the selected section of the remaining second portion ($f_i$) of the overall system frequency spectrum being a different section of said remaining second portion than a selected section used for performing step (b) in a bordering sectional area of an adjacent cell of the plurality of cellular areas closest to said mobile.

2. The method of communicating with mobiles in a mobile radio communication system according to claim 1

CHARACTERIZED IN THAT
   the method comprises the further steps of:
   (c) in performing step (a), transmitting the information in the plurality of primary channels in the first portion of the overall system frequency spectrum via a first antenna means which has a beamwidth which covers the entire area of the associated cell; and
   (d) in performing step (b), transmitting the information in the plurality of secondary channels in the second portion of the overall system frequency spectrum via a second antenna means which has a beamwidth which covers only a portion of the associated cell where interference from other cells in the system is most likely.

3. The method of communicating in a mobile radio communication system in accordance with claim 1 wherein each cell has a hexagonal shape and comprises a first, second and third base station disposed on a first, second and third alternate corner of each hexagonal cell, respectively, each of the base stations in bordering cells being disposed at corresponding corners thereof and use separate directional antenna means each of which being capable of radiating a beam which is aligned at its outer edges with the boundaries of the associated cell on either side of the base station CHARACTERIZED IN THAT
   the method comprises the further steps of:
   (c) in performing step (a), transmitting the information in the plurality of primary available channels from each of the three base stations of a cell in the first portion of the overall system frequency spectrum via a first antenna of the directional antenna means which has a beamwidth which covers the entire area of the associated cell; and
   (d) in performing step (b), transmitting the information in the associated plurality of available secondary channels from each of the three base stations of a cell in the second portion of the overall system frequency spectrum via a second antenna of the directional antenna means which has a beamwidth which covers only a portion of the associated cell at the nearest corners of the associated hexagonal-shaped cell not housing a base station where interference from other cells in the system is most likely.

4. The method of communicating in a mobile radio communication system in accordance with claim 3
   CHARACTERIZED IN THAT the method comprises the further step of:

(e) in performing step (d), transmitting the associated plurality of available secondary channels from each of the three base stations in a cell such that the secondary channels are transmitted to each of a first, second and third alternate interference likely corner area of the cell not housing a base station in a first, second and third selected section ($f_1$, $f_2$, $f_3$), respectively, of the second portion of the overall system frequency spectrum and in a manner whereby each of a first, second and third interference likely corner area bordering on one another from a first, second and third adjacent cell, respectively, uses a separate one of said first, second and third selected section, respectively, of said second portion.

5. In a mobile radio communication system covering a service area which is divided into a plurality of geometrically-shaped cells (10-21), a base station (30-40) for inclusion in each cell comprising an antenna means capable of radiating a beam for communicating with mobiles (24) within the associated cell

CHARACTERIZED IN THAT the base station (30-38) further comprising means (60) capable of transmitting information destined for each of the mobiles within the associated cell in a separate primary channel ($C_p$) of a plurality of available primary channels within a first portion ($f_m$) of an overall system frequency spectrum when a mobile is not experiencing interference from transmissions in corresponding primary channels in other cells of the service area above a predetermined interference level, and means (54, 56) for switching a mobile to a separate predetermined secondary channel ($C_d$) of a plurality of available secondary channels within a selected section ($f_1$, $f_2$, $f_3$) of a remaining second portion ($f_i$) of the overall system frequency spectrum when the mobile experiences interference from other cells above said predetermined interference level in its originally assigned primary channel, the selected section of the remaining second portion ($f_i$) of the overall system frequency spectrum being a different section of said remaining second portion than a selected section used for transmitting secondary channels in a bordering sectional area of an adjacent cell of the system closest to said mobile.

6. A base station in accordance with claim 5
CHARACTERIZED IN THAT
the antenna means at the base station transmits the plurality of available secondary channels only within one selected section of the second portion of the overall system frequency spectrum to each mobile in the associated cell experiencing interference from other cells of the system above said predetermined interference level, said one selected section being different than a one selected section used by the bordering sectional areas of adjacent cells.

7. A base station in accordance with claim 5 wherein the base station is disposed at one corner of a geometrically-shaped cell of the system and the antenna means thereof is capable of radiating a beam whose width corresponds with the boundaries of the associated cell on either side of the base station.

CHARACTERIZED IN THAT the antenna means is capable of transmitting the plurality of available secondary channels in a first selected section of the remaining second portion of the overall system frequency spectrum to mobiles experiencing interference above said predetermined interference level within a first portion of the overall beamwidth of the antenna means, and transmitting the plurality of available secondary channels in a second selected section of the remaining second portion of the overall system frequency spectrum to mobiles experiencing interference above said predetermined interference level within a second portion of the overall beamwidth of the antenna means, said first and second selected sections being different than the selected sections of the second portion of the overall system frequency spectrum used in portions of the other cells adjacent said first and second portions of the overall beamwidth of the antenna means for communicating with mobiles in said other cells experiencing interference above said predetermined interference level.

8. A base station in accordance with claim 7
CHARACTERIZED IN THAT
the antenna means comprises:

first directional antenna means capable of radiating a beam which covers the entire area of the associated cell for transmitting information included in only the plurality of primary channels within the first portion of the overall system frequency spectrum;

second directional antenna means capable of radiating a beam which covers only the first portion of the entire area of the associated cell for transmitting information in the plurality of available secondary channels in a first selected section of the remaining second portion of the overall system frequency spectrum to mobiles experiencing interference above said predetermined interference level within the first portion of the entire cell area, and third directional antenna means capable of radiating a beam which covers only a second portion of the entire area of the associated cell not including said first portion for transmitting information in the plurality of available secondary channels in a second selected section of the remaining second portion of the overall system frequency spectrum to mobiles experiencing interference above said predetermined interference level within the second portion of the entire cell area, said first and second selected sections being different than the selected sections of the second portion of the overall system frequency spectrum used in area portions of the other cells bordering on said first and second portions of the overall cell area for communicating with mobiles in said other cells experiencing interference above said predetermined interference level.

9. In a mobile radio communication system covering a service area which is divided into a plurality of hexagonally-shaped cells (10-21), each cell including a first, second and third base station (30-40) disposed at alternate corners of the associated cell, each base station comprising a directional antenna capable of radiating a beam which is aligned at its outer edges with the boundaries of the associated cell on either side of the base station for communicating with mobiles (24) within the associated cell

CHARACTERIZED IN THAT each of the base stations (30-40) in a cell is capable of transmitting information destined for each of the mobiles within the associated cell in a separate primary channel ($C_p$) of a plurality of available primary channels within a first portion ($f_m$) of an overall system frequency spectrum when a mobile is not experiencing interference from transmissions in corresponding primary channels in other cells of the service area above a predetermined interference level, and for switching a mobile to a separate predetermined secondary channel ($C_d$) of a plurality of available secondary channels within a selected section ($f_1$, $f_2$, $f_3$) of a remaining second portion ($f_i$) of the overall system frequency spectrum when the mobile experiences interference from other cells above said predetermined interference level in its originally assigned primary channel, the selected section of the remaining second portion ($f_i$) of the overall system frequency spectrum being a different selected section of said second portion than a selected section used for transmitting secondary channels in a bordering sectional area of an adjacent cell of the system closest to said mobile.

10. A mobile radio communication system in accordance with claim 9

CHARACTERIZED IN THAT the antenna means at each of the first, second and third base stations transmits the plurality of available secondary channels only within one selected section of the second portion of the overall system frequency spectrum to any mobiles in the associated cell experiencing interference from other cells of the system above said predetermined interference level, said one selected section being different than the one selected sections used by other bordering sectional areas.

11. A mobile radio communication system in accordance with claim 10

CHARACTERIZED IN THAT the antenna means at each of the first, second and third base stations of each cell is capable of transmitting the plurality of available secondary channels in one of a plurality of selected sections of the remaining second portion of the overall system frequency spectrum to mobiles experiencing interference above said predetermined interference level within a designated portion of a first half of the overall beamwidth of the antenna means, and transmitting the plurality of available secondary channels in another one of the plurality of selected sections of the remaining second portion of the overall system frequency spectrum to mobiles experiencing interference above said predetermined interference level within a designated portion of the other half of the overall beamwidth of the antenna means, each of the one and another one of the plurality of selected sections of the remaining second portion of the overall system frequency spectrum being the same as each of the one or another one of the plurality of selected sections used by other base stations in overlapping designated portions of the associated cell, and said one or another one of the plurality of selected sections used in designated portions of the associated cell being different than the selected sections of the second portion of the overall system frequency spectrum used in portions of the other cells bordering on said first and second halves for communicating with mobiles in said other cells experiencing interference above said predetermined interference level.

* * * * *